United States Patent [19]
du Bois et al.

[11] Patent Number: 5,965,661
[45] Date of Patent: Oct. 12, 1999

[54] UNVULCANIZED RUBBER MIXTURE FOR TREADS OF VEHICLE PNEUMATIC TIRES

[75] Inventors: André du Bois, Hannover; Joachim Dumke, Lehrte; Anja Schneider, Hannover; Wolfgang Loreth, Lauenau, all of Germany

[73] Assignee: Continental Aktiengesellschaft, Hannover, Germany

[21] Appl. No.: 08/994,366

[22] Filed: Dec. 19, 1997

[30] Foreign Application Priority Data

Dec. 21, 1996 [DE] Germany .............. 196 53 938

[51] Int. Cl.⁶ .................. C08K 3/34; C08L 9/06
[52] U.S. Cl. .............. 524/575.5; 524/492; 524/571; 524/575; 525/236; 525/237; 152/209 RR; 152/450
[58] Field of Search ............. 524/442, 492, 524/571, 575.5, 575; 525/236, 237; 152/209 RR, 450

[56] References Cited

U.S. PATENT DOCUMENTS

| | | | |
|---|---|---|---|
| 3,692,734 | 9/1972 | Klotzer et al. ............. 524/575.5 X |
| 3,938,574 | 2/1976 | Burmester et al. . | |
| 5,534,574 | 7/1996 | Sandstrom et al. . | |
| 5,717,022 | 2/1998 | Beckmann et al. ............. 524/493 |
| 5,733,963 | 3/1998 | Sandstrom et al. ............. 524/492 |
| 5,744,536 | 4/1998 | Matsui et al. ............. 524/492 |
| 5,804,636 | 9/1998 | Nahmias et al. ............. 524/492 |

FOREIGN PATENT DOCUMENTS

| | | |
|---|---|---|
| 0673792 | 9/1995 | European Pat. Off. . |
| 0677548 | 10/1995 | European Pat. Off. . |
| 0731134 | 9/1996 | European Pat. Off. . |
| 0738613 | 10/1996 | European Pat. Off. . |
| 4442691 | 6/1996 | Germany . |
| 4442692 | 6/1996 | Germany . |

OTHER PUBLICATIONS

Schnetger, *Lexikon der Kautschuk Technik*, pp. 2–25, 506–517, 546–559 (1991).

*Primary Examiner*—Fred Teskin
*Attorney, Agent, or Firm*—Greenblum & Bernstein P.L.C.

[57] ABSTRACT

The invention pertains to a sulfur cross-linkable unvulcanized rubber mixture for the manufacture of treads, in particular for winter tires. The rubber mixture contains polyisoprene, polybutadiene and styrene-butadiene copolymer as well as further fillers and additives. In order to prepare vehicle pneumatic tires which exhibit excellent traction on ice and snow while at least maintaining their wet-gripping ability, the rubber mixture preferably contains, relative to 100 parts of total rubber, 20–100 parts by weight cis-1,4 polyisoprene; 0–65 parts by weight polybutadiene with a cis content of greater than about 90 mole %; and 0–65 parts by weight solution-polymerized styrene-butadiene copolymer; as well as 65–120 parts by weight silicic acid.

20 Claims, No Drawings

UNVULCANIZED RUBBER MIXTURE FOR TREADS OF VEHICLE PNEUMATIC TIRES

CROSS-REFERENCE TO RELATED APPLICATIONS

The present invention claims the priority under 35 U.S.C. § 119 of German Patent Application No. 196 53 938.2 filed Dec. 21, 1996, the disclosure of which is expressly incorporated by reference herein in its entirety.

BACKGROUND INFORMATION

1. Field of the Invention

The present invention relates to a sulfur cross-linkable unvulcanized rubber mixture for the production of treads, in particular for snow tires, which contains the rubber mixture components polyisoprene, polybutadiene and styrene-butadiene copolymer as well as further fillers and additives.

2. Discussion of Background Information

Since the driving characteristics of a tire depend to a great degree on the rubber composition of the tread, particularly high demands are placed thereon. Optimizing these characteristics is difficult, in particular for snow tires which, on the one hand, must exhibit good traction capabilities on snow and ice as well as on wet road surfaces, but on the other hand should show little roll resistance and little abrasion. It has been determined that the fillers which are used have a critical effect on the driving-behavior characteristics of the winter tire.

Rubber mixtures for treads containing only carbon black exhibit a balanced relationship between their behavior on wet and wintery road surfaces, but not, however, at a satisfactory level. In addition, winter tires are known in prior art whose treads consist of rubber mixtures which contain silicic acid as part of the fillers material. With these mixtures, winter tires with improved wet characteristics are created—an improvement in the winter characteristics is, however, not possible, so that such mixture systems are also not optimally suited.

In DE 44 42 691 and DE 44 42 692, rubber mixtures for treads are disclosed whose rubber components are emulsion- or solution- polymerized styrene-butadiene copolymer, polyisoprene, and polybutadiene. Silicic acid (25–90 weight parts) or carbon black should be used as the filler. It has been shown, however, that these rubber mixtures are not sufficiently suited for winter tires, since the use of emulsion-polymerized styrene-butadiene copolymer causes a worsening of the winter characteristics and further causes greater abrasion.

SUMMARY OF THE INVENTION

The present invention is directed to tires, such as winter tires, with excellent traction on snow and ice while at least maintaining their wet-gripping capability.

Also, the present invention is directed to a sulfur cross-linkable unvulcanized rubber mixture for the manufacture of treads. The rubber mixture comprises a rubber component comprising 100 weight parts of total mass of rubber comprising: about 20–100 parts by weight cis-1,4 polyisoprene, and about 15–50 parts by weight of polybutadiene having a 1,4-cis content of greater than 90 mole %; and a filler component comprising, relative to the 100 parts by weight of total mass of rubber: about 65–120 parts by weight silicic acid.

In accordance with the present invention, the tires are prepared with a rubber mixture that comprises about 20–100 phr cis-1,4 polyisoprene, about 0–65 phr polybutadiene with a cis content greater than about 90 mole %, about 0–65 phr solution-polymerized styrene-butadiene copolymer, and about 65–120 phr silicic acid, relative to 100 parts of the entire unvulcanized rubber. Unless otherwise specified, the unit phr (per hundred rubber) herein refers to parts by weight with respect to 100 parts of the total proportion of rubber.

More specifically, the present invention provides a sulfur cross-linkable unvulcanized rubber mixture, comprising a rubber component and a filler component, for the manufacture of treads. The rubber component preferably comprises about 20–100 phr cis-1,4 polyisoprene, about 0–65 phr polybutadiene with a cis content of greater than about 90 mole %, and about 0–65 phr styrene-butadiene copolymer which is preferably solution-polymerized styrene-butadiene copolymer.

The rubber component may comprise, for example, about 20–50 phr cis-1,4 polyisoprene, about 15–50 phr polybutadiene with a cis content of greater than about 90 mole %, and about 15–65 phr solution-polymerized styrene-butadiene copolymer. The rubber component may also comprise, for example, about 51–75 phr cis- 1,4 polyisoprene, about 0–49 phr polybutadiene with a cis content of greater than about 90 mole %, and about 0–49 phr solution-polymerized styrene-butadiene copolymer. The rubber component may also comprise, for example, about 76–100 phr cis- 1,4 polyisoprene, about 0–24 phr polybutadiene with a cis content of greater than about 90 mole %, and about 0–24 phr solution-polymerized styrene-butadiene copolymer.

The cis-1,4 polyisoprene of the rubber component preferably comprises natural unvulcanized rubber.

The filler component may comprise common fillers and/or additives. The filler component may comprise, for example, silicic acid, carbon black, sulfur, silicone, antioxidants, auxiliary treatment agents, and softeners, such as cold flexible softeners. The filler component preferably comprises about 65–120 phr silicic acid. The filler component also preferably comprises carbon black, preferably about 10–40 phr carbon black.

The present invention also provides tires, preferably pneumatic vehicle tires, comprising a tire tread, wherein the tire tread is manufactured from any of the rubber mixtures disclosed herein.

DETAILED DESCRIPTION OF THE INVENTION

The particulars shown herein are by way of example and for illustrative discussion of the present invention only and are presented in the cause of providing what is believed the most useful and readily understood description of the principles and conceptual aspects of the present invention. In this regard, no attempt is made to illustrate the invention in more detail than is necessary for the fundamental practicing of the preferred embodiments of the invention. The description makes apparent to those skilled in the art how various forms of the invention may be embodied in practice.

Surprisingly, it has been found that a high proportion (greater than or about 35 phr) of polymers with a low glass temperature (cis-polyisoprene: ca. −70° C., polybutadiene with a cis content of greater than about 90 mole %: ca. −100° C.) in combination with about 65–120 phr silicic acid and further common additives result in rubber mixtures for winter tires which offer excellent traction on wet as well as on wintery, icy road surfaces. Up until now, rubber mixtures having a high polymer content which exhibited a very low glass temperature, in combination with carbon black, showed excellent winter characteristics, but their grip on wet surfaces was not optimal. Further, experiments with rubber mixtures having a high content of polymers with a very low glass temperature in connection with emulsion polymerized styrene-butadiene copolymer and mixtures filled with a great amount of silicic acid showed worse abrasion and insufficient winter characteristics in comparison to mixtures in accordance with the invention.

The rubber component of the rubber mixture for winter tires in accordance with the invention preferably comprises polyisoprene, which preferably has a cis-1,4 proportion greater than or about 90 mole %. Polyisoprene of this type can be created by a stereospecific polymerization in solution with Ziegler-Natta catalyzers or by using finely distributed alkyl lithium. Natural unvulcanized rubber is preferably used for the rubber mixture for the treads of winter tires in accordance with the invention. The proportion of cis- 1,4 polyisoprene in natural unvulcanized rubber is >99 mole %.

The rubber component also preferably comprises polybutadiene with a cis-1,4 proportion of greater than or about 90 mole %. Such high cis proportions can, for example, be reached by solution polymerization in the presence of catalyzers of the rare earth type. This high cis content is necessary in order to attain a sufficiently low glass temperature. The cis-1,4 proportion of butadiene is preferably in the range of about 90 to 99 mole %, and the cis- 1,2 proportion preferably less than or about 5 mole %.

The rubber component also preferably comprises styrene-butadiene copolymer which is preferably manufactured in solution (S-SBR). This type of styrene-butadiene may be manufactured, for example, through the use of alkyl lithium. The proportion of styrene in this polymer is preferably about 15 to 35 mole %. VSL 1940 S 20 (trade name of Bayer) is a commercially available S-SBR useful in this invention.

The filler component of the rubber mixture preferably comprises silicic acid. Grades of silicic acid which are preferably used in the rubber mixture in accordance with the invention are known. The silicic acids have a BET surface of preferably about 145–270 $m^2/g$ (ASTM D 5604), a CTAB number of preferably about 120–285 $m^2/g$ (ASTM D 3765) and a pore volume of preferably about 0.7–1.7 ml/g (DIN 66133). Silicic acid sold as VN3 by the Degussa company may be used, for example.

To bind the silicic acid to the polymer system, activating materials, for example silicones, may be used. Preferred silicones include bis-3-(triethoxysilylpropyl) tetrasulfide (TESPT) or the corresponding disulfide.

The filler component also preferably comprises carbon black, which has advantages pertaining to treatment. Amounts of carbon black from about 10 to 40 phr can be mixed in the rubber mixture, thereby lending it the desired characteristics. The carbon black has a DBP number (ASTM D 2414) of preferably about 90–200 $cm^3/100$ g, and a CTAB number (ASTM D 3765) of preferably about 80–170 $m^2/g$. Carbon black classified as N121 (according to ASTM-D 1765) may be used. Suppliers include Degussa, Inc.

The filler component of the rubber mixture for winter tires in accordance with the invention preferably contains usual proportions of additives such as antioxidants, treatment auxiliary agents, and softeners, also cold flexible softeners, for example rapeseed oil. These special softeners have certain advantages with regard to treatment and lend the tire treads better winter characteristics. Sulfur or sulfur dispensers are preferably used for vulcanizing and, in addition, materials such as accelerators or activators which influence vulcanization should preferably be used. Suitable vulcanization accelerators include, for example, conventional commercially available accelerators such as CBS (benzothiazyl-2-cyclohexyl sulphenamide) and DPG (N,N'-phenyl guanidine).

Rubber components comprising cis-1,4 polyisoprene, polybutadiene with a cis content of greater than about 90 mole %, and solution-polymerized styrene-butadiene-rubber, in the proportions disclosed herein, and with a filler component comprising about 65–120 phr silicic acid, result in rubber mixtures for treads of winter tires which exhibit excellent traction on wet as well as on wintery road surfaces.

It is particularly preferred if the proportion of cis-1,4 polyisoprene is about 20–50 phr, the polybutadiene content with a cis proportion of greater than about 90 mole % is about 15–50 phr, the proportion of solution-polymerized styrene-butadiene-rubber is about 15–65 phr, and the rubber mixture comprises about 65–120 phr silicic acid. It has been determined that a relatively balanced relationship between the characteristics can be attained in this range.

It is further preferred if the rubber mixture contains about 51–75 phr cis-1,4 polyisoprene in combination with polybutadiene and/or solution-polymerized styrene-butadiene-rubber, and about 65–120 phr silicic acid. It has been determined that especially good winter characteristics can be attained thereby while maintaining the wet-slippage behavior.

A further advantageous embodiment of the invention consists in the use of about 76–100 phr cis-1,4 polyisoprene (preferably natural unvulcanized rubber), more preferably about 85–95 phr, in combination with polybutadiene and/or solution-polymerized styrene-butadiene-rubber, and about 65–120 phr silicic acid for treads of winter tires. Surprisingly, it could be established that excellent wet characteristics could be achieved in spite of the very low glass temperature of the mixture.

Embodiments of rubber mixtures according to the present invention, as well as comparative examples, are described in greater detail in Table 1. Amounts in Table 1 are expressed in phr.

Tires can be made from rubber mixtures of the present invention by any suitable method, including methods known to those of ordinary skill in the art, e.g., as disclosed in "Lexikon der Kautschuktechnologie," Schnetger, ed., (Huthig Buch Verlag GmbH, Heidelberg, 1991), pages 506–517.

TABLE 1

| | Standard Mixtures (phr) | | | | Mixtures in accordance with invention (phr) | | | | | |
|---|---|---|---|---|---|---|---|---|---|---|
| | 1 | 2 | 3 | 4 | 1 | 2 | 3 | 4 | 5 | 6 |
| Rubber Component | | | | | | | | | | |
| cis-1,4 polyisoprene (natural rubber) | 60 | 10 | 60 | 35 | 35 | 30 | 60 | 100 | 90 | 35 |
| Polybutadiene (BR) cis content >90 mole % | 20 | 45 | 20 | 32.5 | 32.5 | 15 | 40 | — | 10 | 32.5 |
| E-SBR Cariflex S 5820 | 20 | — | 20 | 32.5 | — | — | — | — | — | — |
| S-SBR VSL 1940 S 20 | — | 45 | — | — | 32.5 | 55 | — | — | — | 32.5 |
| Filler Component | | | | | | | | | | |
| Silicic acid VN3 | — | 70 | 20 | 70 | 70 | 70 | 70 | 70 | 70 | 100 |
| Carbon black N 121 | — | 10 | — | 10 | 10 | 10 | 10 | 10 | 10 | 10 |
| Carbon black N 234 | 80 | — | 60 | — | — | — | — | — | — | — |
| Sulfur | 1.8 | 1.5 | 1.8 | 1.5 | 1.5 | 1.5 | 1.5 | 1.5 | 1.5 | 1.5 |
| CBS | 1.8 | 1.5 | 1.8 | 1.5 | 1.5 | 1.5 | 1.5 | 1.5 | 1.5 | 1.5 |
| DPG | — | 2 | — | 2 | 2 | 2 | 2 | 2 | 2 | 2 |
| Silicone (TESPT) | — | 7 | — | 7 | 7 | 7 | 7 | 7 | 7 | 10 |
| Characteristics | | | | | | | | | | |
| Winter [%] | 100 | 99 | 100 | 100 | 104 | 102 | 108 | 104 | 105 | 104 |
| Wet [%] | 100 | 105 | 103 | 105 | 105 | 108 | 100 | 109 | 108 | 114 |
| Abrasion Resistance [%] | 100 | 110 | 100 | 95 | 105 | 100 | 100 | 90 | 95 | 95 |

The wet, winter or abrasion characteristics named relate to measurement results of the Standard Mixture 1. These were assigned the value 100, so that values greater than 100 represent an improvement of the respective characteristic, and values less than 100 represent a worsening thereof.

It can be seen from Table 1 that conventional tread mixtures which contain carbon black (Standard Mixture 1) or carbon black and silicic acid (Standard Mixtures 2 to 4) as the filler are on a comparable level in the winter characteristics. These winter characteristics are not affected by a partial exchange of silicic acid for carbon black, as is the case with the wet characteristics. An improvement of traction on ice and snow is made possible only by the combination in accordance with the invention of a polymer system on the basis of cis polyisoprene, polybutadiene (cis content of >90 mole %) and solution-polymerized styrene-butadiene copolymers in connection with the filler silicic acid in the given concentration. The essential characteristic for winter tires, namely, traction on snow and ice, is affected by the rubber mixture for treads in accordance with the invention in a positive manner, while essentially raising the adherence on wet road surfaces. It is insignificant thereby whether the entire tread is manufactured from a single mixture or exhibits, for example, a cap-and-base construction; the important thing is that at least the surface coming in contact with the road is manufactured from the rubber mixture in accordance with the invention. Thus, characteristics which are as yet unattainable with regard to adherence on wintery and wet road surfaces could be achieved in accordance with the invention.

This result was particularly surprising since experiences with the use of polymers having low glass temperatures would not have suggested such a conclusion.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and amended, without departing form the scope and spirit of the invention in its aspects. Although the invention has been described herein with reference to particular materials and embodiments, the invention is not intended to be limited to the particulars disclosed herein; rather, the invention extends to a functionally equivalent structures, methods and uses, such as are within the scope of the appended claims.

What is claimed:

1. A sulfur cross-linkable unvulcanized rubber mixture for the manufacture of treads, said rubber mixture comprising a rubber component and a filler component, said rubber component comprising:

about 20–100 parts by weight cis-1,4 polyisoprene;

about 0–65 parts by weight polybutadiene with a cis content of greater than 90 mole %, and;

about 0–65 parts by weight solution-polymerized styrene-butadiene copolymer; per 100 parts by weight of said rubber component, and a filler component comprising about 65–120 parts by weight silicic acid per 100 parts by weight of said rubber component.

2. The rubber mixture according to claim 1, wherein said rubber component comprises:

about 20–50 parts by weight cis-1,4 polyisoprene;

about 15–50 parts by weight polybutadiene with a cis content of greater than 90 mole %, and;

about 15–65 parts by weight solution-polymerized styrene-butadiene copolymer.

3. The rubber mixture according to claim 2, wherein said cis-1,4 polyisoprene comprises natural unvulcanized rubber.

4. The rubber mixture according to claim 2, wherein said filler component comprises carbon black.

5. The rubber mixture according to claim 1, wherein said rubber component comprises:

about 51–75 parts by weight cis-1,4 polyisoprene;

about 0–49 parts by weight polybutadiene with a cis content of greater than 90 mole %; and about 0–49 parts by weight solution-polymerized styrene-butadiene copolymer.

6. The rubber mixture according to claim 5, wherein said cis-1,4 polyisoprene comprises natural unvulcanized rubber.

7. The rubber mixture according to claim 5 wherein said filler component comprises carbon black.

8. The rubber mixture according to claim 1, wherein said rubber component comprises:
  about 76–100 parts by weight cis-1,4 polyisoprene;
  about 0–24 parts by weight polybutadiene with a cis content of greater than 90 mole %; and
  about 0–24 parts by weight solution-polymerized styrene-butadiene copolymer.

9. The rubber mixture according to claim 8, wherein said cis-1,4 polyisoprene comprises natural unvulcanized rubber.

10. The rubber mixture according to claim 8, wherein said filler component comprises carbon black.

11. The rubber mixture according to claim 8, wherein said filler component comprises about 10–40 parts by weight carbon black per 100 parts by weight of said rubber component.

12. Vehicle pneumatic tires comprising a tire tread, wherein said tire tread is manufactured from a rubber mixture comprising a rubber component and a filler component, said rubber component comprising:
  about 20–100 parts by weight cis-1,4 polyisoprene;
  about 0–65 parts by weight polybutadiene with a cis content of greater than 90 mole %, and;
  about 0–65 parts by weight solution-polymerized styrene-butadiene copolymer; per 100 parts by weight of said rubber component, and a filler component comprising about 65–120 parts by weight silicic acid per 100 parts by weight of said rubber component.

13. Vehicle pneumatic tires according to claim 12, wherein said rubber component comprises:
  about 20–50 parts by weight cis-1,4 polyisoprene;
  about 15–50 parts by weight polybutadiene with a cis content of greater than 90 mole %, and;
  about 15–65 parts by weight solution-polymerized styrene-butadiene copolymer.

14. Vehicle pneumatic tires according to claim 12, wherein said rubber component comprises:
  about 51–75 parts by weight cis-1,4 polyisoprene;
  about 0–49 parts by weight polybutadiene with a cis content of greater than 90 mole %; and
  about 0–49 parts by weight solution-polymerized styrene-butadiene copolymer.

15. Vehicle pneumatic tires according to claim 12, wherein said rubber component comprises:
  about 76–100 parts by weight cis-1,4 polyisoprene;
  about 0–24 parts by weight polybutadiene with a cis content of greater than 90 mole %; and
  about 0–24 parts by weight solution-polymerized styrene-butadiene copolymer.

16. A sulfur cross-linkable unvulcanized rubber mixture for the manufacture of treads, the rubber mixture comprising:
  a rubber component comprising 100 weight parts of total mass of rubber comprising:
    about 20–100 parts by weight cis-1,4 polyisoprene, and
    about 15–50 parts by weight of polybutadiene having a 1,4-cis content of greater than 90 mole %; and
  a filler component comprising, relative to the 100 parts by weight of total mass of rubber:
    about 65–120 parts by weight silicic acid.

17. The rubber mixture of claim 16, wherein the rubber component comprises up to about 65 parts by weight solution-polymerized styrene-butadiene copolymer.

18. The rubber mixture of claim 16, wherein the rubber component comprises:
  about 20–50 parts by weight cis-1,4 polyisoprene; and
  about 15–65 parts by weight solution-polymerized styrene-butadiene copolymer.

19. The rubber mixture of claim 18, wherein the cis-1,4 polyisoprene comprises natural unvulcanized rubber.

20. The rubber mixture of claim 16, wherein the rubber component comprises:
  about 76–100 parts by weight cis-1,4 polyisoprene;
  up to about 24 parts by weight polybutadiene having a 1,4-cis content of greater than 90 mole %; and
  up to about 24 parts by weight solution-polymerized styrene-butadiene copolymer.

* * * * *